W. SCHWENDLER.
Gate-Roller.

No. 211,796. Patented Jan. 28, 1879.

WITNESSES:
Achilles Schehl.
C. Sedgwick.

INVENTOR:
W. Schwendler
BY Munn & Co.
ATTORNEYS.

UNITED STATES PATENT OFFICE.

WILLIAM SCHWENDLER, OF APPLETON, WISCONSIN.

IMPROVEMENT IN GATE-ROLLERS.

Specification forming part of Letters Patent No. 211,796, dated January 28, 1879; application filed December 11, 1878.

*To all whom it may concern:*

Be it known that I, WILLIAM SCHWENDLER, of Appleton, in the county of Outagamie and State of Wisconsin, have invented a new and useful Improvement in Gate-Rollers, of which the following is a specification:

My invention relates to a roller adapted especially for hanging gates upon, so that the gates may roll back, and also swing with the roller as its hinge.

My invention consists in a flanged roller fitted upon a screw-pin by a ball-joint, whereby it may turn axially, and also swing at an angle to its supporting-pin. The ball of the joint has a movement independent of the wheel, and the contact-surfaces of the joint are fitted with a washer to take the wear.

The details of construction constituting the invention are more fully set forth in the specification.

Figure 1:
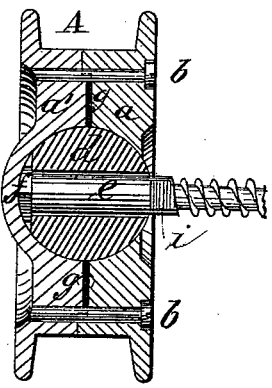
Figure 2:
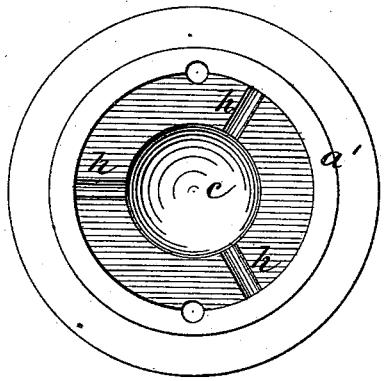

In the accompanying drawings, Figure 1 is a section of my improved roller in line with the screw-pin. Fig. 2 is an elevation of one of the disks forming the roller.

Similar letters of reference indicate corresponding parts.

The roller A is made of two circular disks, $a\ a'$, held together by screws or bolts $b$, each disk having a flange, as shown, so that when secured together they form a double-flanged roller. Each disk $a\ b$ is formed with a central semi-spherical cavity, as seen at $c$, Fig. 2, which form the socket for a ball, $d$, which is loose upon its screw-pin $e$, that passes through the ball and is held thereto by a nut, $f$. The screw-pin $e$ extends through the side of disk $b$, an opening being provided for that purpose; and I prefer that the ball project slightly out of the same opening, so as to give a more extended movement of the roller on its ball-joint.

Between the disks $a\ b$ is a washer, $g$, of leather or other suitable material, the edges of which are in contact with ball $d$, and act to prevent wear of the ball. The ball turns upon its pin $e$, and the roller turns on the ball, which construction also assists in reducing the wear to the minimum point.

In the face of disk $a$ are formed radial grooves $h$, (see Fig. 2,) which serve as channels through which oil may be introduced to the washer to keep it soft and oil the inner contact-surfaces.

This construction furnishes a superior roller for gates, combining roller and hinge. When the screw is to be driven into the gate-post the ball and roller can be removed, and there will be nothing to interfere. The screw $e$ is squared at $i$, to facilitate screwing it into the post by a suitable tool. To remove the ball the roller must first be taken off, as the nut is covered by the roller. I prefer to form the flanges of the roller flaring outward, so that they will not cut the gate-board that rests between them.

Having thus described my invention, I claim as new and desire to secure by Letters Patent—

1. The improved gate-roller consisting of flanged disks $a\ b$, united together upon a ball that is carried by a supporting pin or screw, and having a washer, $g$, clamped between the two parts of the roller, substantially as and for the purposes set forth.

2. In a gate-roller, the combination of the flanged roller A, ball $a$, and pin or screw $e$, the ball being placed loosely upon the pin and retained in place, substantially as described and shown, and for the purposes set forth.

WILLIAM SCHWENDLER.

In presence of—
  A. H. KELLOGG,
  GEO. F. LEWIS.